(12) United States Patent
Joergensen

(10) Patent No.: US 6,551,634 B2
(45) Date of Patent: Apr. 22, 2003

(54) METHOD FOR PRODUCTION OF CHEWING OR BUBBLE GUM PIECES

(76) Inventor: Hans Boerge Joergensen, Ormslevvej 22, DK-8260 Virby J. (DK)

( * ) Notice: Subject to any disclaimer, the term of this patent is extended or adjusted under 35 U.S.C. 154(b) by 167 days.

(21) Appl. No.: 09/866,625

(22) Filed: May 30, 2001

(65) Prior Publication Data

US 2001/0053397 A1 Dec. 20, 2001

Related U.S. Application Data

(63) Continuation-in-part of application No. 08/913,720, filed on Dec. 9, 1998, now abandoned.

(51) Int. Cl.[7] .............................. A23G 3/30; A61K 9/68
(52) U.S. Cl. ......................... 426/5; 426/289; 426/303; 424/48
(58) Field of Search ................. 426/3, 5, 6, 4, 426/518, 524, 103, 303, 305, 289; 424/48

(56) References Cited

U.S. PATENT DOCUMENTS

| | | | |
|---|---|---|---|
| 1,526,039 A | 2/1925 | Arkell et al. ................. | 426/3 |
| 4,824,681 A | 4/1989 | Schobel et al. ................. | 426/5 |
| 4,828,845 A | 5/1989 | Zamudio-Tena et al. ........ | 426/5 |
| 4,933,190 A | 6/1990 | Cherukuri et al. ............. | 426/5 |
| 5,128,155 A | 7/1992 | Song et al. ..................... | 426/5 |
| 5,145,696 A | 9/1992 | Patel et al. ..................... | 426/5 |

FOREIGN PATENT DOCUMENTS

EP    0 217 109    4/1985

*Primary Examiner*—Nina Bhat
(74) *Attorney, Agent, or Firm*—Antonelli, Terry, Stout & Kraus, LLP

(57) ABSTRACT

The present invention is a method of producing a chewing or bubble gum piece and a chewing or bubble gum piece. A gum piece in accordance with the invention has a core (1) which may contain flavoring, a mixture of flavoring and medicine or all medicine. The core is encapsulated with an intermediate layer (2) which is free from gummy mass. The intermediate layer is encapsulated with an outer layer (3) which is an outer layer of a gum piece that is placed in the mouth of a person chewing the gum which contains gummy mass. The intermediate layer separates the core from contact with outer layer.

12 Claims, 1 Drawing Sheet

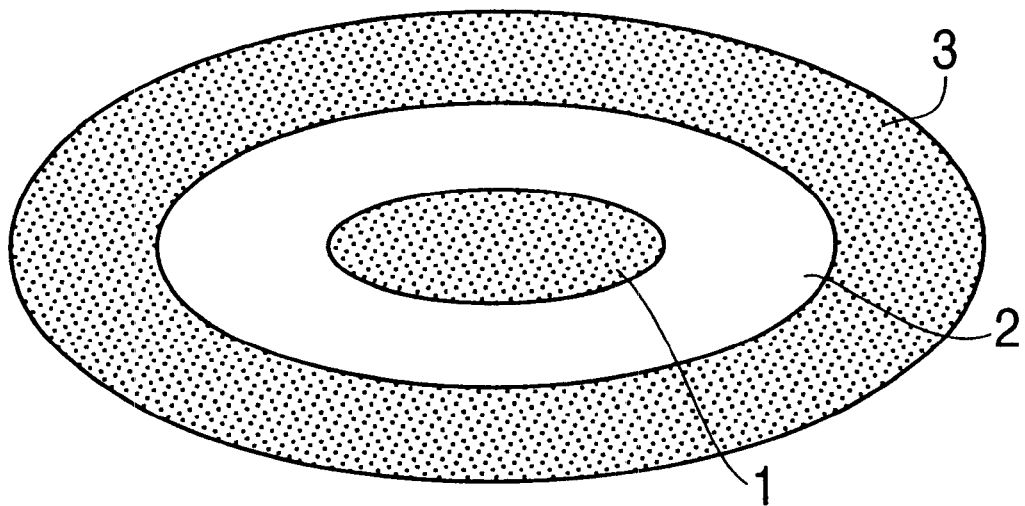

METHOD FOR PRODUCTION OF CHEWING OR BUBBLE GUM PIECES

CROSS-REFERENCE TO RELATED APPLICATION

This application is a continuation-in-part of Ser. No. 08/913,720, filed Dec. 9, 1998, now abandoned, entitled Method For Production of Chewing or Bubble Gum and Chewing or Bubble Gum which application is incorporated herein by reference in its entirety.

BACKGROUND OF THE INVENTION

1. Field of the Invention

The present invention relates to a method for production of chewing or bubble gum pieces and chewing and bubble gum pieces.

2. Description of the Prior Art

There are many different kinds of chewing gums, for instance in plates, small pieces with or without encapsulation, stratified chewing gum, filled chewing gum with fluid contents, coated chewing gum or extruded chewing gum.

Gummy masses used in gum may be found in many variations. The following gummy masses are available from nature: Chicle, Dead Borneo and Pontianaco. However, most of the gummy masses are produced by rubber, resin and wax. Furthermore there also exist synthetic gummy masses.

Generally it is a fact that all gummy masses may contain only a limited quantity of flavorings which contain oil or grease. Supersaturation with flavoring causes destruction of the gummy mass.

The gummy mass itself is a viscous, hard mass, which normally is mixed with glucose and sugar, and which is thereafter formed.

U.S. Pat. No. 5,128,155 discloses chewing gum having a gum base, a water soluble bulk portion and a flavor releasing structure. The flavor releasing structure comprises a flavor reservoir material, which can be a non-thermoplastic material and a binding material, which can be a thermoplastic or thermosetting material or a combination of both materials forming a core of the flavor releasing structure. The flavor releasing structure is in small cores which are mixed into the gum mass and may be coated to prevent the flavoring from migrating from the numerous cores into the gum.

SUMMARY OF THE INVENTION

The invention is a method for production of an improved chewing or bubble gum with an extra strong taste and better durability (taste intensity). The method is carried out such that an inner core of flavoring is separated from an outer gummy mass containing layer by an intermediate middle layer which envelopes the core and separates the core from the outer layer containing gummy mass. The outer layer is an outer layer of a gum piece which is placed in the mouth of a person chewing the gum piece. The outer layer is prepared by mixing a gummy mass with softener, freezing the mixture, pulverizing the frozen mixture and thereafter using the pulverized material to coat the intermediate layer. In a simple manner the outer gummy mass which is the outer layer of a gum piece, may be kept totally separated from the oily or greasy flavorings of the inner core, which usually decompose the gummy mass. As a result a chewing or bubble gum may be produced with an extra strong taste and better durability (taste intensity), where the flavorings and the gummy mass are not mixed until chewing occurs.

Furthermore the invention relates to a chewing or bubble gum pieces, produced in accordance with the method according to the invention, comprising a flavoring containing core, an intermediate gummy mass free layer which encapsulates the core and an outer layer which is an outer layer of a gum piece that is placed in the mouth of a person chewing the gum and contains gummy mass which outer layer encapsulates the intermediate layer. The outer gummy mass containing layer is applied as a pulverized material. The pulverized material is formed by mixing a gummy mass and softener to produce a mixture, freezing the mixture and pulverizing the mixture to form the pulverized material.

The chewing or bubble gum pieces according to the invention may comprise a core, which instead of or as a supplement to the flavorings contains a medicine mass.

BRIEF DESCRIPTION OF THE DRAWING

The FIGURE illustrates the core and enveloping layers of a gum or bubble gum pieces in accordance with the invention.

DESCRIPTION OF THE PREFERRED EMBODIMENTS

A piece of gum in accordance with the invention is illustrated in the FIGURE. The FIGURE illustrates a single piece of gum which is placed in the mouth of a chewer and is chewed in the conventional manner of chewing chewing gum. The piece of gum has three layers which are single inner layer 1, a single intermediate layer 2 and a single outer layer 3.

A mass of sugar, glucose, gelatine, sugar-free ingredients or the like is produced and desired flavorings are added in such a quantity to produce the core 1 and having a strong taste. The core 1 is formed as pellets, pastilles, tablets or the like.

The outer gummy mass 3 is an outer layer of the gum piece that is placed in the mouth of a person chewing the gum. The outer layer 3 is formed in the following manner. A gummy mass is softened by adding a suitable quantity of softener for instance in the form of flavorings, whereafter it is frozen and pulverized (as for instance with a process comparable to the manufacture of milled coffee).

The core 1 is pre-encapsulated with an intermediate layer 2 free from gummy mass. Because the intermediate layer 2 is free from gummy mass and seals the core 1, there is no harmful interaction of the oily or greasy flavoring of the core with the outer layer which contains gummy mass. Thereafter the encapsulation of the intermediate layer 2 with the outer layer 3 is completed in a conventional manner to form a complete gum piece which is placed in the mouth of the person chewing the gum. The outer layer 3 is formed by adding pulverized gummy mass formed by the aforementioned mixing and freezing process which coats the intermediate layer with the pulverizing material containing gummy mass, whereafter a unique gum, differing totally from known types of gum is produced, with gummy mass being on the outside.

To form the pulverized material which is applied to form the outer coating 3, a mixture containing gummy mass, glucose, sugar and sorbitol is frozen and pulverized. In the same manner waste from the production of gum may also be crushed and recycled into the materials used to form the outer layer 3 since separation of the supersaturated core 1 of the flavoring and the pulverized recycling gummy mass is achieved by the intermediate layer 2 which is free from gummy mass.

During the coating of the outer layer 3 liquid is added. This liquid may also contain gummy mass. For instance, warmed glucose is added to a suitable quantity of pulverized gummy mass, which is thinned with water during stirring. In any case gummy mass is contained in the outer layer 3 which coats the intermediate layer.

In principle it is important that the outer gummy mass 3 is kept totally separated from the core 1 by the intermediate barrier layer 2 which is free from gummy mass (having no gummy mass). The intermediate layer's composition of being free from gummy mass prevents the known harmful degrading of gummy mass caused by contact with the oily or greasy flavoring of the core 1. With the present invention, the outer layer 3 containing the gummy mass, as a result of the barrier produced by the intermediate layer 2 having no gummy mass, is free from the degrading which would occur if the oily or greasy flavoring were to contact the gummy mass.

A chewing or bubble gum with extra strong taste and better durability (taste intensity) is produced, when the inner core 1 containing flavorings and the outer layer 3 containing gummy mass are not mixed and do not contact each other until chewing occurs.

What is claimed is:

1. A method of production of chewing or bubble gum pieces comprising:

providing a single core comprising a flavoring;

coating the core with a single intermediate layer which is free from gummy mass to envelop the core and seal the core from being degraded by a single outer layer; and coating the intermediate layer with the single outer layer which is a single outer layer of each single gum piece which is placed in the mouth of a person chewing the gum piece and comprises a gummy mass.

2. A method in accordance with claim 1 wherein:

the outer layer is formed by mixing a gummy mass and softener to produce a mixture, freezing the mixture, pulverizing the mixture and coating the intermediate layer by applying the pulverized mixture to form the outer layer.

3. A method in accordance with claim 1 wherein:

the core also contains medicine.

4. A method in accordance with claim 2 wherein:

the core also contains medicine.

5. A method of production of chewing or bubble gum pieces comprising:

providing a single core containing only medicine;

coating the core with a single intermediate layer which is free from gummy mass to envelop the core and seal the core from being degraded by a single outer layer; and coating the intermediate layer with the single outer layer which is a single outer layer of each gum piece which is placed in the mouth of a person chewing each single gum piece and comprises a gummy mass.

6. A method in accordance with claim 5 wherein:

the outer layer is formed by mixing a gummy mass and softener to produce a mixture, freezing the mixture, pulverizing the mixture and coating the intermediate layer by applying the pulverized mixture to form the outer layer.

7. A chewing or bubble gum piece comprising:

a single core comprising flavoring;

a single intermediate layer which is free from gummy mass which envelops and seals the core from being degraded by a single outer layer coating the intermediate layer; and wherein the outer layer, which is a single outer layer of each gum piece which is placed in the mouth of a person chewing the gum piece and comprises a gummy mass.

8. A chewing or bubble gum in accordance with claim 7 wherein:

the outer layer is formed by mixing a gummy mass and softener to produce a mixture, freezing the mixture, pulverizing the mixture and coating the intermediate layer by applying the pulverized mixture to form the outer layer.

9. A chewing or bubble gum in accordance with claim 7 wherein:

the core also contains medicine.

10. A chewing or bubble gum in accordance with claim 8 wherein:

the core also contains medicine.

11. A chewing or bubble gum piece comprising:

a single core comprising medicine;

a single intermediate layer which is free from the gummy mass which envelops and seals the core from being degraded by a single outer layer coating the intermediate layer; and wherein the outer layer which is a single outer layer of each gum piece which is placed in the mouth of a person chewing the gum piece and comprises a gummy mass.

12. A chewing or bubble gum in accordance with claim 11 wherein:

the outer layer is formed by mixing a gummy mass and softener to produce a mixture, freezing the mixture, pulverizing the mixture and coating the intermediate layer by applying the pulverized mixture to form the outer layer.

* * * * *